No. 736,878. Patented August 18, 1903.

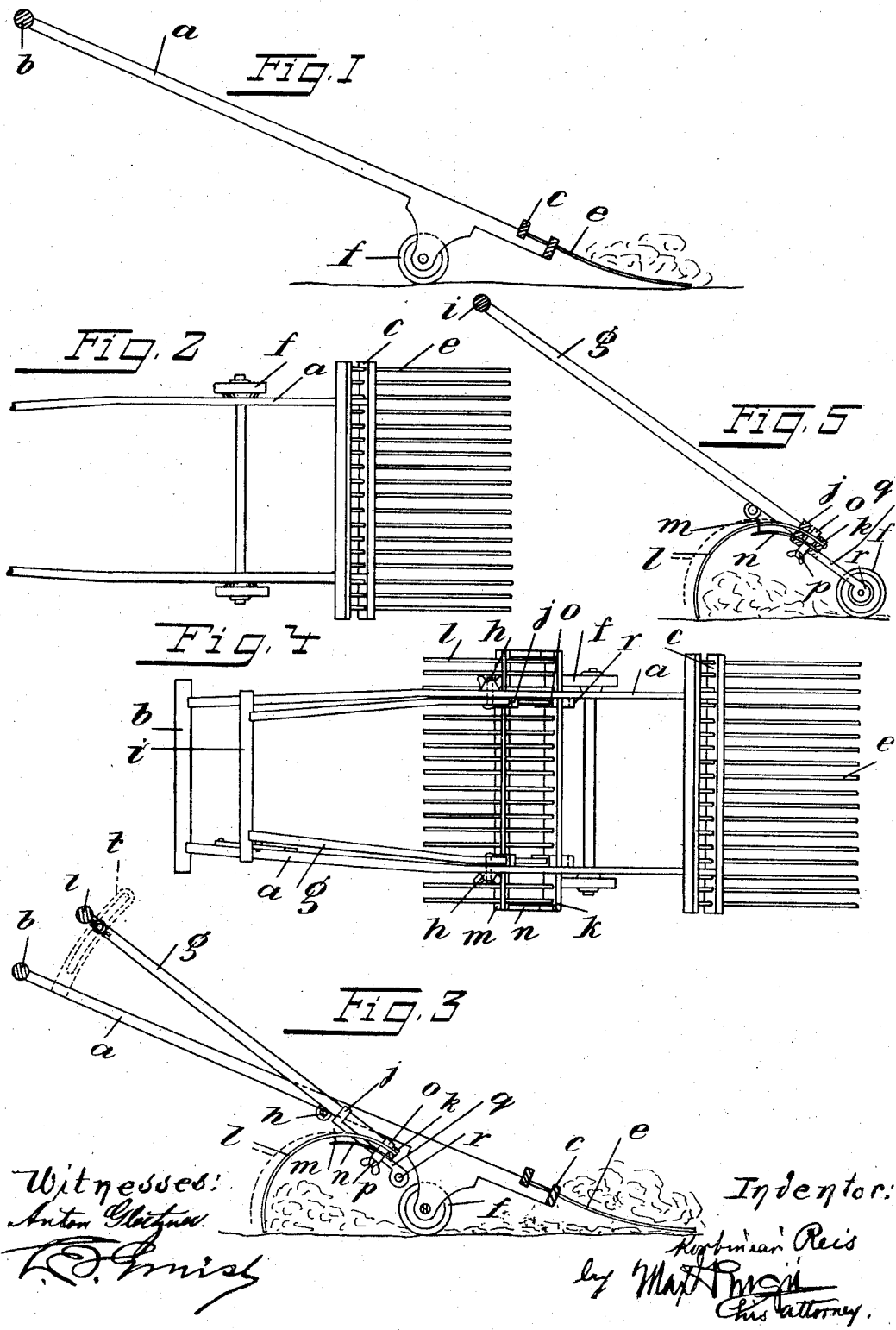

UNITED STATES PATENT OFFICE.

KORBINIAN REIS, OF MUNICH, GERMANY, ASSIGNOR TO AUGUST KLUMPP, OF MUNICH, GERMANY.

RAKE.

SPECIFICATION forming part of Letters Patent No. 736,878, dated August 18, 1903.

Application filed March 4, 1903. Serial No. 146,113. (No model.)

*To all whom it may concern:*

Be it known that I, KORBINIAN REIS, a citizen of Bavaria, Germany, residing at Munich, Bavaria, Germany, have invented certain new and useful Improvements in Rakes; and I do hereby declare the following to be a full, clear, and exact description of the invention, such as will enable others skilled in the art to which it appertains to make and use the same.

The object of the present invention is a device for harvesting and gleaning hay, straw, and the like, which consists of rakes mounted in various combinations upon rollers or wheels in order to be transportable like a wheelbarrow and adapted to divers uses.

The accompanying drawings illustrate such a device as follows:

Figure 1 is an elevation of the main rake and operating-frame. Fig. 2 is a plan view of the same. Fig. 3 is an elevation of the main rake and gleaning-rake in combination. Fig. 4 is a plan view of the device as illustrated in Fig. 3, and Fig. 5 is an elevation of the gleaning-rake adapted for independent use.

The rake-prongs $e$ are secured to a frame $a$, which latter is mounted upon rollers or wheels $f$ and provided with a handle $b$. Such a disposition enables the operator to easily manipulate rakes of any size. In some cases it may be desirable to combine such a harvesting-rake with another rake destined to glean up the material left behind the first. The combination of these two rakes may be made in such manner that each rake can be separately operated and that the gleaning-rake can be lifted or lowered to the earth independently of the first one in order to put the gleaner out of action—for instance, when the workman lays aside the material gathered—or in order to follow the unevenness of the soil. Such a combined rake is shown in Figs. 3 and 4, while Fig. 5 shows the detached gleaning-rake. The second or gleaning rake 1 is mounted upon a frame $g$, similar to that of the first rake, but having no rollers or wheels. The prongs of the rake 1 are secured to the transverse bar $k$ and built up, preferably, of thin downwardly-bent steel wires, which when meeting obstructions will yield upwardly, as shown in dotted lines in Figs. 3 and 5. On their upper part said prongs are strengthened and stiffened by means of an iron frame $m$ and $n$. The two frames $a\ b$ and $g\ i$ are movably secured together in such manner that the two parts may be adjusted to the soil independently the one from the other during the operating of the apparatus. This independent motion of the two forks may be attained in different manners.

In the form of construction shown in Figs. 3 and 5 of the drawings the frame $g\ i$ of the gleaning-rake is hinged on the pivot $h$ of the frame $a\ b$ of the rake $e$.

The operation of the combined apparatus is the following: When harvesting, the workman will push forward the apparatus like a wheelbarrow in such manner that the prongs contact with the soil in order to gather up the matter to be harvested. He will use his gleaner only when the harvesting-rake has not caught all the matter, in which case he will lower the gleaning-rake by means of the handle $i$ without interfering with the working of the first rake, so that the gleaning-rake will gather and accumulate the matter left behind. In this way the workman is enabled to lift or lower the two rakes independently of each other, so that unevennesses of the soil can be avoided and foreign bodies, as stones, roots, or pieces of wood, &c., be easily removed. When a sufficient quantity of matter is gathered upon the prongs, the apparatus will be stopped, and the accumulated matter will be put aside in cocks by drawing back the apparatus and swinging the rake to right and to left. The matter gathered before the gleaner can be heaped on the cock thus formed by operating either the gleaning or the harvesting rake. On the frame $a$ a segmental guide $t$ can be provided for, in which slotted guide the gleaner may be fastened by means of a screw. Such a fixing of the gleaning-rake may be desirable—as, for instance, when the gleaner is to be put out of action for a considerable time or when working on level soil, where the gleaner will be constantly in use. The gleaner-frame may moreover be mounted detachably, so that the same when not employed can be removed in order to lighten the apparatus. In such case the gleaner-frame $g$ may be also mounted upon rollers fixed in the adjustable bearings $q\ r$ by means of the screws $p$.

What I claim as my invention is—

1. In a device of the character described, the combination with a main rake, of a second rake adjustably mounted upon the first rake and coöperating therewith.

2. In a device of the character described, the combination with a main rake mounted upon wheels, of a second rake mounted on the first rake in such manner as to be operable independently thereof.

3. In a device of the character described, the combination, with a main rake mounted upon wheels, of a second rake pivotally mounted on the first rake in such manner as to be independently adjustable and adapted to be brought into use at will to glean the leavings from the main rake.

4. In a device of the character described, the combination, of a main rake and a second rake detachably secured together in such manner as to be independently adjustable and to coöperate in use, said rakes being also adapted to be disjoined and used independently.

5. In a device of the character described, the combination, with a main rake consisting of prongs mounted upon the forward end of an operating-frame, and wheels carrying said frame and rake, of a second rake consisting of yielding curved prongs mounted upon a suitable operating-frame, means for pivotally connecting the second rake with the first rake in an adjustable manner, means for securing the two rakes in desired adjustment for coöperative use, and means adapting both of said rakes to be used independently.

In testimony whereof I affix my signature in presence of two witnesses.

KORBINIAN REIS.

Witnesses:
 WALTER E. BOWMAN,
 CLARA I. PARKER.